United States Patent [19]

Hechenberger et al.

[11] 4,292,229
[45] Sep. 29, 1981

[54] ADHESIVES

[75] Inventors: Dieter A. Hechenberger, Esch; Angelika Neye, Baden, both of Fed. Rep. of Germany

[73] Assignee: Lingner + Fischer, Fed. Rep. of Germany

[21] Appl. No.: 179,764

[22] Filed: Aug. 20, 1980

[30] Foreign Application Priority Data

Aug. 22, 1979 [GB] United Kingdom ............... 29226/79

[51] Int. Cl.$^3$ .............................. C09J 3/00; C09J 3/12
[52] U.S. Cl. .......................... 260/30.6 R; 260/31.2 N; 260/32.6 NR; 260/32.8 N; 210/33.2 R; 210/33.4 UR; 210/33.6 UB; 210/33.8 UB; 525/130; 206/813
[58] Field of Search ................... 260/30.6 R, 32.6 NR, 260/31.2 N, 32.8 N, 33.6 UB, 33.8 UB, 33.2 R, 33.4 UR; 525/130; 206/813

[56] References Cited

U.S. PATENT DOCUMENTS 3,576,776 12/1968 Muszik et al. ..................... 260/18 R
3,846,363 11/1974 Ando et al. ................. 260/29.6 BM
3,917,554 11/1975 Inoue et al. .................... 260/32.8 N

FOREIGN PATENT DOCUMENTS 1552417 9/1979 United Kingdom .

OTHER PUBLICATIONS

Chem. Abs., vol. 84, #45604(a), "Solid Adhesives", Ando et al.
Derwent Abst., 88493 A/49, "Thermally Stable, Solvent-type Rubber Adhesive Compsn . . . ".
Derwent Abs., 90756 A/50, "Hot Melt Adhesive . . . ", (J53129-233).

Primary Examiner—Joseph L. Schofer
Assistant Examiner—Herbert F. Lilling
Attorney, Agent, or Firm—Jacobs & Jacobs

[57] ABSTRACT

Synthetic rubber based adhesives comprising a solution of
(a) a linear branched-chain polyurethane rubber,
(b) a carboxylated butadiene-acrylonitrile rubber, containing at least 50% butadiene by weight, and
(c) the reaction product of sorbitol and benzaldehyde in a non-aqueous solvent system and, optionally,
(d) a non-aqueous solution of a phenolic resin, are form-retentive and are useful in glue-sticks.

9 Claims, No Drawings

ADHESIVES

The present invention relates to synthetic rubber-based solvent adhesives formulated as solid gels.

Form-retentive adhesives, e.g. so-called glue sticks, have the advantages over other adhesive formulations of great convenience of dispensing and application. In order to be suitable for this purpose an adhesive formulation must have adequate rigidity and abradability. Up to now only aqueous-based adhesives have been produced.

Glue-sticks of this type, comprising a water-compatible soluble resin in an aqueous base gelled with a soap, are disclosed in German Auslegeschrift No. 1,811,466 and U.S. Pat. No. 3,576,776. German Auslegeschrift No. 2,204,482 discloses glue-sticks consisting of a mixture of water and a water-miscible organic solvent, a conventional adhesive resin soluble therein and the reaction product of sorbitol and benzaldehyde (so called 'benzylidene sorbitol'), optionally with a boron compound, as a structuring agent.

However, such aqueous-based adhesives suffer from the disadvantage of having low strength and being slow drying. Moreover, they suffer from the disadvantages that at least one of the two surfaces to be glued has to be permeable to enable the glue to dry. Hence, they are only generally suitable for gluing, for example, paper.

Solvent-based adhesives made of polychloroprene rubber have the advantage of high strength (especially if eg a phenolic resin is incorporated), quick drying, and of being applicable by way of the contact method, ie the adhesive is applied onto the two surfaces to be glued and all of the solvents having evaporated the surfaces are pressed together and a high initial strength is achieved immediately. However, it has not been possible to produce such adhesives in a satisfactory form-retentive presentation.

Other synthetic rubber-based contact adhesives, made for example of acrylonitrile rubber or linear—branched chain polyurethane rubber, suffer from the disadvantage of a short 'open time'.

Hitherto it has not been possible to produce any solvent-based formulation fulfilling the criteria for a satisfactory form-retentive adhesive.

Surprisingly, we have now found certain form-retentive rubber-based solvent adhesives which have the advantages of both conventional aqueous-based form-retentive adhesives and conventional rubber-based solvent adhesives without the concomitant disadvantages of these formulations.

Accordingly, the present invention provides a synthetic-rubber-based solvent adhesive in solid gel form, which adhesive comprises a solution of:

(a) a linear branched-chain polyurethane rubber, (b) a carboxylated butadiene-acrylonitrile rubber containing at least 50% butadiene by weight, and (c) the reaction product of sorbitol and benzaldehyde, in a non-aqueous solvent system.

The invention also provides an adhesive comprising a non-aqueous solution of a phenolic resin and the above components.

When used herein, 'linear branched-chain polyurethane rubber' means a polyurethane rubber comprising linear di-isocyanate-diol chains and having branches within the repeat unit.

Similarly when used herein 'carboxylated butadiene-acrylonitrile rubber' means a nitrilebutadiene rubber incorporating unsaturated organic acid monomer units.

The present adhesives may comprise a single non-aqueous solvent, the solvent system is usually a mixture, the solvents being generally selected on the basis of suitable evaporation rates, lack of toxicity, and suitability for dissolving the adhesive polymers.

Such mixtures generally contain at least one polar solvent, such as a mono- or poly-hydric alcohol, dimethylformamide or hexamethylphosphoramide. Examples of suitable alcohols include iso-butanol and diacetone alcohol and O-alkylated glycols, such as 2-methoxyethanol and 2-ethoxyethanol. Preferred polar solvents include isobutanol, diacetone alcohol and 2-methoxyethanol, in particular 2-methoxyethanol.

Other solvents within the solvent system are suitably those conventionally used in rubber-based solvent adhesives, with the proviso that they are miscible with the polar solvent mentioned above.

Examples of suitable non-aqueous solvents which are miscible with polar solvents include ketones, for example methylethyl ketone, esters, for example aliphatic esters such as ethyl acetate, and aromatic hydrocarbons, for example toluene. Further suitable solvents include aliphatic hydrocarbons such as hexane, heptane or aliphatic petroleum fractions, and chlorinated hydrocarbons such as chloroethane. Preferred solvents include methylethyl ketone, ethyl acetone and toluene, in particular methylethyl ketone.

Examples of suitable solvent mixtures include at least one polar solvent as exemplified above and one or more of the above listed non-aqeuous solvents. Preferred solvent mixtures include methylethyl ketone with isobutanol, 2-methoxyethanol and/or diacetone alcohol.

The skilled man will appreciate that the solvents and their ratios are chosen to give adequate solution of the proportions of the rubbers and sorbitol-benzaldehyde reaction product chosen for the desired properties of the adhesive. Typically the solvent system constitutes 40 to 80% by weight of the total adhesive, preferably 50 to 70%. The polar solvent is often present as 1 to 20% by weight of the total adhesive, preferably 5 to 10%.

The rubbers are generally each present as 5 to 40% by weight of the total adhesive, preferably 10 to 30%.

It has been found that only butadiene-acrylonitrile rubbers containing at least 50% butadiene by weight are suitable for the adhesives of the present invention.

The reaction product of sorbitol and benzaldehyde (commonly known as 'benzylidene sorbitol') is generally taken to consist of one or more of mono-, di- and tribenzylidene sorbitol. Its preparation is outlined in German Auslegeschrift 2,204,482. The benzylidene sorbitol generally constitutes 1 to 5% by weight of the total adhesive, preferably 2 to 3% by weight.

Suitable phenolic resins include those optionally substituted phenol-formaldehyde resins conventionally used in structural adhesives. When present the resin forms 5 to 20% by weight of the total adhesive, preferably 10 to 15%.

The present invention also provides a process for the preparation of the present adhesives, which process comprises dissolving:

(a) a linear branched-chain polyurethane rubber, (b) a carboxylated butadiene-acrylonitrile rubber containing at least 50% butadiene by weight, and (c) the reaction product of sorbitol and benzaldehyde in a non-aqueous solvent system.

The following Examples illustrate the preparation of adhesives according to the present invention but are not intended to limit the invention in any way.

EXAMPLE 1

A glue stick having an adhesive composition as below was prepared as follows:

| Component | % by weight |
| --- | --- |
| Methylethyl ketone | 55.5 |
| 2-Methoxyethanol | 7.0 |
| Q-Thane 6620/10 linear branched-chain polyurethane rubber (K.J. Quinn, Leinfelden) | 10.0 |
| Heyplast AC 345 Z carboxylated butadiene-acrylonitrile rubber containing at least 50% butadiene by weight (Paul Tiefenbacher, Hamburg) | 10.0 |
| Benzylidene sorbitol | 2.5 |
| Alresen PA 104 (phenolic resin) (Hoechst AG, Frankfurt-a.M) | 15.0 |

The benzylidene sorbitol was dissolved in the mixture of the two solvents under reflux with stirring. After cooling to about 70° C., the two rubbers were added, and the mixture was stirred well at that temperature until homogeneous (about 4 hr). The resin was added, and the mixture was stirred until the resin was dissolved (about 30 min.). The mixture was poured into conventional glue-stick dispensers and allowed to cool to room temperature.

EXAMPLE 2

Glue sticks of the following adhesive composition were prepared by the method of Example 1:

| Component | % by weight |
| --- | --- |
| Methylethyl ketone | 43.0 |
| Iso-butanol | 10.0 |
| Diacetone alcohol | 5.0 |
| Q-Thane 6620/10 | 20.0 |
| Heyplast 696 carboxylated butadiene-acrylonitrile rubber containing at least 50% butadiene by weight (Paul Tiefenbacher, Hamburg) | 10.0 |
| Benzylidine sorbitol | 2.5 |
| Alresen PA103 (phenolic resin) (Hoechst AG, Frankfurt - a.M) | 10.0 |

We claim:

1. A synthetic-rubber-based solvent adhesive for use in glue-sticks characterised in that the adhesive comprises a solution of:
   (a) a linear branched-chain polyurethane rubber,
   (b) a carboxylated butadiene-acrylonitrile rubber, containing at least 50% butadiene by weight, and
   (c) the reaction product of sorbitol and benzaldehyde in a non-aqeuous solvent system.

2. An adhesive according to claim 1 which further comprises (d) a non-aqueous solution of a phenolic resin.

3. An adhesive according to claim 1 wherein the solvent system comprises two or more solvents, at least one of which is a polar solvent, the other solvents being miscible with the polar solvent.

4. An adhesive according to claim 3 wherein the solvent system comprises at least one polar solvent selected from isobutanol, diacetone alcohol and 2-methoxyethanol and a second solvent selected from methylethyl ketone, ethylacetone and toluene.

5. An adhesive according to claim 1 wherein the solvent system constitutes from 40 to 80% by weight of the total adhesive.

6. An adhesive according to claim 1 wherein the rubber constitutes from 5 to 40% by weight of the total adhesive.

7. An adhesive according to claim 1 wherein the benzylidene and sorbitol reaction product constitutes from 1 to 5% by weight of the total adhesive.

8. An adhesive according to claim 2 wherein the phenolic resin constitutes from 5 to 20% by weight of the total adhesive.

9. A glue-stick comprising a glue stick dispenser filled with an adhesive according to claim 1.

* * * * *